United States Patent
Friedman et al.

(10) Patent No.: US 7,039,806 B1
(45) Date of Patent: May 2, 2006

(54) METHOD AND APPARATUS FOR PACKAGING AND TRANSMITTING DATA

(75) Inventors: George Friedman, Austin, TX (US); Robert Phillip Starek, Austin, TX (US); Carlos A. Murdock, Austin, TX (US)

(73) Assignee: Infraworks Corporation, TX (US)

( * ) Notice: Subject to any disclaimer, the term of this patent is extended or adjusted under 35 U.S.C. 154(b) by 1160 days.

(21) Appl. No.: 09/701,230

(22) PCT Filed: Sep. 29, 2000

(86) PCT No.: PCT/US00/26893

§ 371 (c)(1),
(2), (4) Date: Nov. 28, 2000

(87) PCT Pub. No.: WO01/26277

PCT Pub. Date: Apr. 12, 2001

Related U.S. Application Data

(60) Provisional application No. 60/157,472, filed on Oct. 1, 1999, and provisional application No. 60/206,947, filed on May 25, 2000.

(51) Int. Cl.
*G06F 1/26* (2006.01)

(52) U.S. Cl. ............... 713/170; 713/182; 713/189; 713/200; 713/201

(58) Field of Classification Search ............ 713/170, 713/182, 189, 200, 201
See application file for complete search history.

(56) References Cited

U.S. PATENT DOCUMENTS

| | | | |
|---|---|---|---|
| 5,751,814 A | 5/1998 | Kafri | |
| 6,006,328 A | 12/1999 | Drake | |
| 6,009,525 A | 12/1999 | Horstmann | |
| 6,012,083 A * | 1/2000 | Savitzky et al. | 709/202 |
| 6,052,780 A | 4/2000 | Glover | |
| 6,141,681 A | 10/2000 | Kyle | |
| 6,678,882 B1 * | 1/2004 | Hurley et al. | 717/121 |

* cited by examiner

*Primary Examiner*—Thomas R. Peeso
(74) *Attorney, Agent, or Firm*—DLA Piper Rudnick Gray Cary US LLP

(57) ABSTRACT

A system and method for communicating a package of information. The system comprises a machine readable medium having information packaging software that generates a computer executable file (FIG. 1, 14) comprising a package of information. The packet information comprises the file of data and encryption software. The system communicates the package of information over a network (FIG. 1, 16) that is in communication with a machine readable medium. A client computer system (FIG. 1, 17) in communication with the network is adapted to receive the package of information and execute the computer executable. The computer system has a client permissions database (FIG. 1, 20) and a vault adapted to receive the package of information.

22 Claims, 3 Drawing Sheets

METHOD AND APPARATUS FOR PACKAGING AND TRANSMITTING DATA

This application is a 371 of PCT/US00/26893 filed on Sep. 29, 2000 and claims benefit of 60/157,472 filed on Oct. 01, 1999 and claims benefit of 60/206,947 filed on May 25, 2000.

FIELD OF THE INVENTION

The invention relates to a method and apparatus for packaging and transmitting a file of data. In particular, the invention relates to a method and apparatus for packaging data in a computer executable file, the package having one or more permissions associated with and governing use of the file of data.

BACKGROUND OF THE INVENTION

The 20$^{th}$ century is filled with technological advances, but none more significant than the advent of computers, electronic and digital communications, and the Internet. These technologies have offered the world access to oceans of information on every topic imaginable and have enabled people all over the world to communicate electronically, such as, for example, by sending electronic messages over a network such as the Internet. Cellular and digital technologies have revolutionized the way people communicate via telephone and, in addition, have spawned the development of new devices such as personal digital assistants, pocket personal computers and email pagers that are able to receive and transmit information that can be stored on these devices, forwarded to another device, uploaded onto a computer system, or printed.

A known problem with current technologies is that the author of an electronic message is unable to retain control over what happens to the message after it is transmitted across the network. For example, the recipient may forward the message to another user, print the message, store the message for later viewing, or copy the message to the clipboard. An author may not want a sensitive email or message transmitted to a third party, or a copy of the message stored or printed for future reference. However, current technologies do not completely address this need.

Some mail programs allow an author to designate a message as "private." This setting limits a recipients ability to modify an original message and forward it to a third party with the appearance that the message, as modified, was transmitted by the author. However, this setting does not limit a recipient's ability to forward, copy to the clipboard, store or print the message in its original form.

There exists a need in the field of electronic and digital communications to have a method and apparatus that allows an author to set permissions on a communication which restrict the recipient's ability to use the transmitted information. Furthermore, there is also a need for method and apparatus that allows the author to insure that only the intended recipient receives the message. The current invention addresses this need by providing a method and apparatus for generating an encrypted package of data comprising a file of data, a unique identifier, and one or more permissions governing use of the file. The package may also contain the recipient's unique identifier and a client software package to be installed on the recipient's computer system upon receipt of the package.

SUMMARY OF THE INVENTION

The invention relates to a method for packaging and transmitting data and a system for carrying out the method.

One system of the invention comprises a machine readable medium having information packaging software that generates a computer executable file, a network in communication with the machine readable medium, and a client computer system in communication with the network. A package of information is concatenated into the computer executable file for transmission over the network. In one embodiment, the package of information contains a file of data, a permissions database having one or more permissions associated with the file of data, and encryption software. The client computer is adapted to receive the package of information and execute the computer executable file. The client computer system also has a client permissions database and a vault adapted to receive the package of information.

One method of the invention comprises the steps of receiving a file of data for packaging, receiving a permissions database having one or more permissions associated with the file of data, the one or more permissions governing a client's use of the file, generating a package global unique identifier, generating a package of data comprising the file, the one or more permissions and the global unique identifier, encrypting the package and generating a computer executable file comprising the encrypted package.

Another method of the invention adds to the above-described method the steps of receiving the computer executable file at a client computer system having an operating system and executing the computer executable file at the client computer system. Executing the file comprises the steps of determining whether the operating system is a compatible operating system, and if so, executing a client software on the client computer system. The execution of the client software creates a client permissions database and a vault on the client computer system. After executing the client software, the method further comprises the step of determining whether the encrypted package is valid, and if so, recording the package global unique identifier in the client permissions database, extracting the file of data and the one or more permissions from the package of data, storing the file of data in the vault and storing the one or more permissions in the client permissions database. If the package is not valid, the method sets a state in the computer executable file to indicate that the package is installed.

BRIEF DESCRIPTION OF THE DRAWINGS

For the purpose of illustrating the invention, there is shown in the drawings a form which is presently preferred; it being understood, however, that this invention is not limited to the precise arrangements and instrumentalities shown.

DETAILED DESCRIPTION OF PREFERRED EMBODIMENTS OF THE INVENTION

The present invention comprises a novel method and apparatus for packaging data and communicating the package over a network. The terms "computer", "computer system", or "system" as used herein include any device capable of receiving, transmitting, and/or using information, including, without limitation, a processor, a microprocessor, a personal computer, such as a laptop, palm PC, desktop or workstation, a network server, a mainframe, an electronic wired or wireless device, such as for example, a telephone, an interactive television, such as for example, a television adapted to be connected to the Internet or an electronic device adapted for use with a television, a cellular telephone, a personal digital assistant, an electronic pager, and a digital watch. In an illustrative example, information is transmitted in the form of e-mail. A computer, computer system, or system of the invention may operate in communication with other systems over a network, such as, for example, the Internet, an intranet, or an extranet, or may operate as a stand-alone system. Also, the terms "information" and "data" as used herein are each intended to include the broadest definition of the other, and each include text, audio and video data. By way of further example, the term "information" can mean raw data, processed data, or a combination of raw and processed data.

The following description is presented to enable any person skilled in the art to make and use the invention. Descriptions of specific applications are provided only as examples. Various modifications to the preferred embodiment will be readily apparent to those skilled in the art, and the generic principles defined herein may be applied to other embodiments and applications without departing from the spirit and scope of the invention. Thus, the present invention is not intended to be limited to the embodiment shown. On the contrary, the description of the invention set forth herein is intended to cover all alternatives, modifications and equivalents as may be included within the spirit and scope of the invention as defined by the appended claims.

Figure 1:
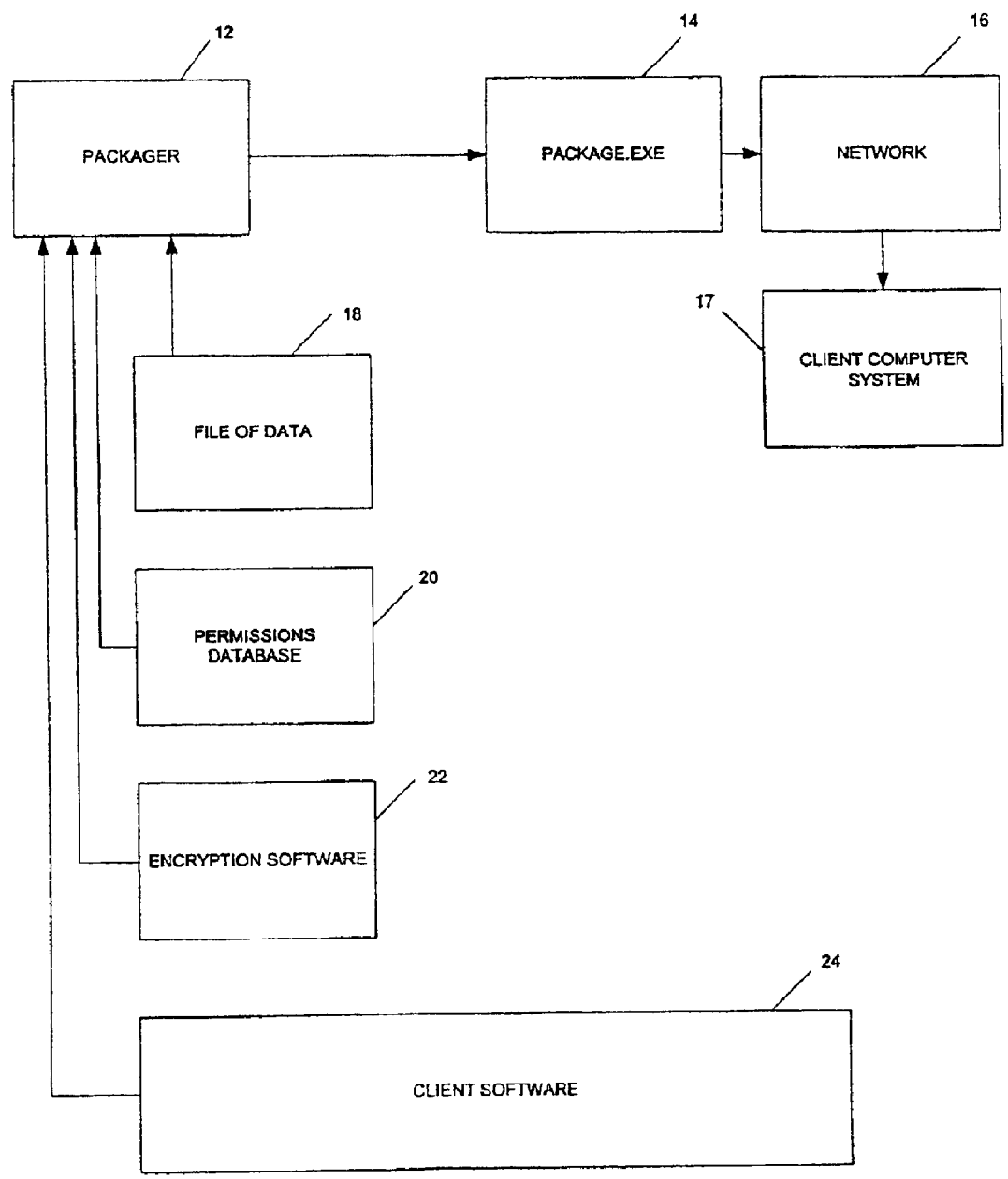
FIG. 1 is a flow diagram of a system that communicates a package of information according to an embodiment of the invention.

Referring now to FIG. 1 there is shown a block diagram of a system that communicates a package of information in accordance with a preferred embodiment of the present invention. A packager 12 generates a computer executable file, such as "package.exe" 14 for transmission over a network 16 to a client computer system 17 for access by a client. The computer executable file 14 comprises a package of information collected by the packager 12.

According to one embodiment of the invention, the package of information includes a file of data 18 and a permissions database 20. In another embodiment of the invention, the package of information further includes encryption software 22 and, optionally but not necessarily, client software 24. Preferably, the client software has a version designation. Packager 12 generates a package global unique identifier (PGUID) for each package of information and includes it in the package of information. In a preferred embodiment, the package of information, including the PGUID are encrypted by encryption software 22. The PGUID may be, for example, a string of alpha-numeric symbols.

According to a method of the invention, packager 12 receives the file of data 18 and the permissions database 20. The permissions database 20 has one or more author-configurable permissions associated with the file of data 18 that govern use of the file of data 18. One function of these permissions is to restrict sharing of the file of data 18. Exemplary author-configurable permissions include access count, access time, expiration date, authorization date, clipboard permission, print permission, unlimited access permission, application permission, and a system-events permission.

The access account permission specifies the number of times a user may be allowed to access the file of data 18. In an embodiment, one access count is defined as allowing one process on the client computer system 17 to access the file of data 18 for the life of the process. The access time permission specifies the total amount of time in which a client may access a file. Once a process on the client computer system 17 opens the file of data 18, the access time is decremented until the process terminates or, if the access time is completely exhausted before termination of the process, the process is automatically terminated.

The expiration date permission specifies a date on which the file of data will no longer be accessible. A client will have unlimited access to the file, subject to any other permissions on the file of data 18, until the expiration date occurs. If any processes on the client computer system 17 have the file of data 18 open on the expiration date, the processes are automatically terminated. On the expiration date, the file content is overwritten and deleted. Preferably, the expiration date permission is also removed from the permissions data base.

The authorization date permission specifies a date on which the file of data 18 will become accessible. Subject to other permissions on the file of data 18, a user will not be able to access the file of data 18 until that date has passed. All of these access permissions can be configured and enforced independently or in combination.

The clipboard permission specifies whether the client can copy the file of data 18 or a portion of the file, such as, for example, to the Windows clipboard. The clipboard permission may also be configured to prevent the client from forwarding the file of data to another computer system. The print permission specifies whether the client can print the file of data 18. The unlimited access permission grants the client unlimited access to the file of data 18. Preferably, the file of data 18 is read-only, which allows a client with unlimited access permission to view the file of data 18 for an unlimited amount of time. However, the client will not be permitted to do anything more unless other permissions are associated with the file of data 18, such as, for example, print permission, and clipboard permission.

The application permission determines whether one or more of a list of applications is running on the client computer system 17 and disables access to the file of data if one of the applications is running. Alternatively, the application permission may disable access to the file of data if one of the applications is not running. The system-events permission analyzes the client computer system 17 to determine which system-events have occurred and determines whether to permit access to the file of data 18 based on the system-events that have occurred.

In a preferred embodiment, the packager 12 can define a password to limit access to the package. The package of information will not be accessed until the client enters the appropriate password at the client computer system 17. In another embodiment, the packager 12 may receive a recipient global unique identifier (RGUID) and include it in the package of information. The RGUID identifies the client to whom the author wishes to transmit the file of data 18 and may be manually entered into the package by the author or selected from a list of clients stored in the packager 12.

The package of information is concatenated into the computer executable file 14 for transmission over the network 16 to the client computer system 17.

Figure 2A:
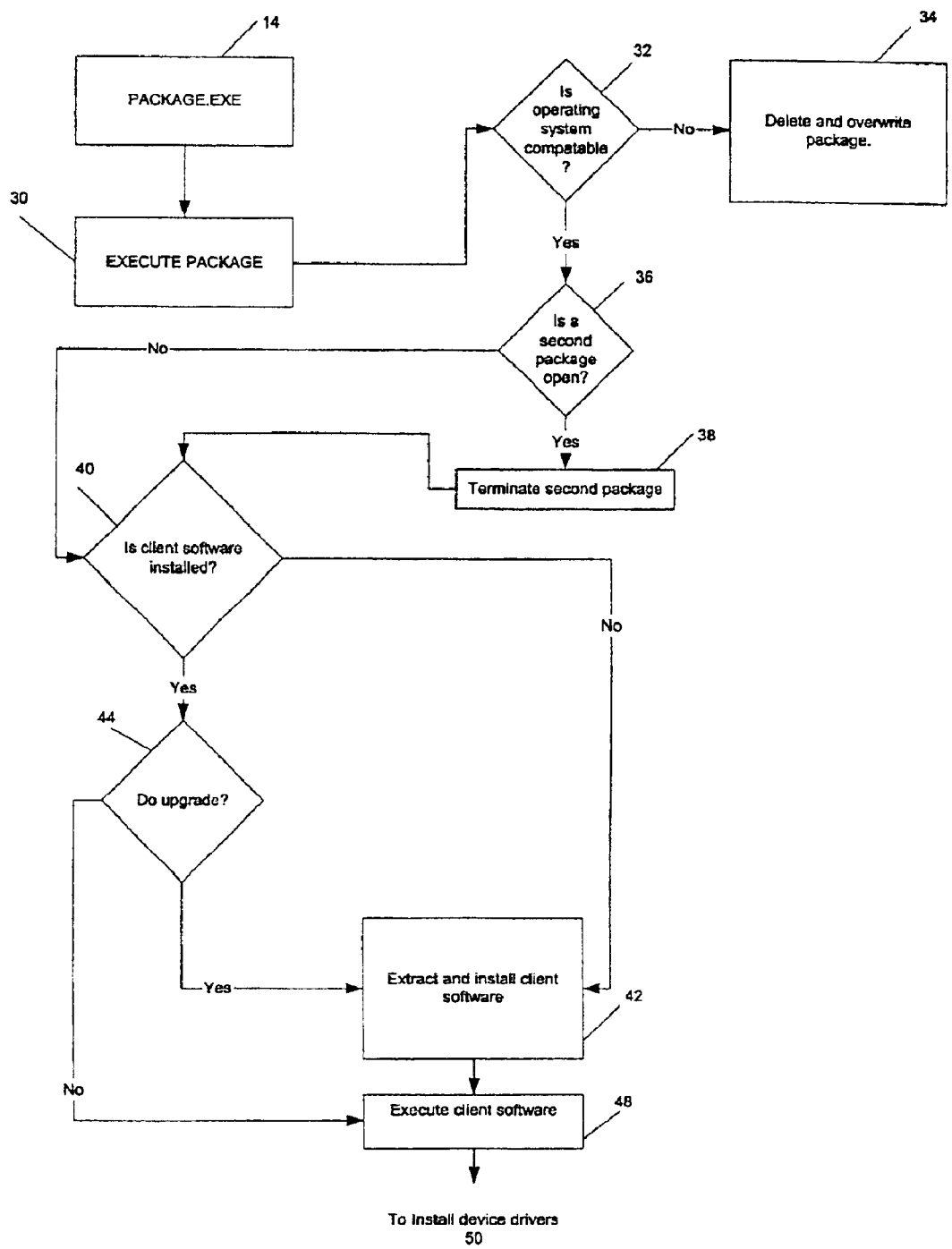
FIG. 2 is a flow diagram of a method for communicating an electronic package according to another embodiment of the invention.
Figure 2B:
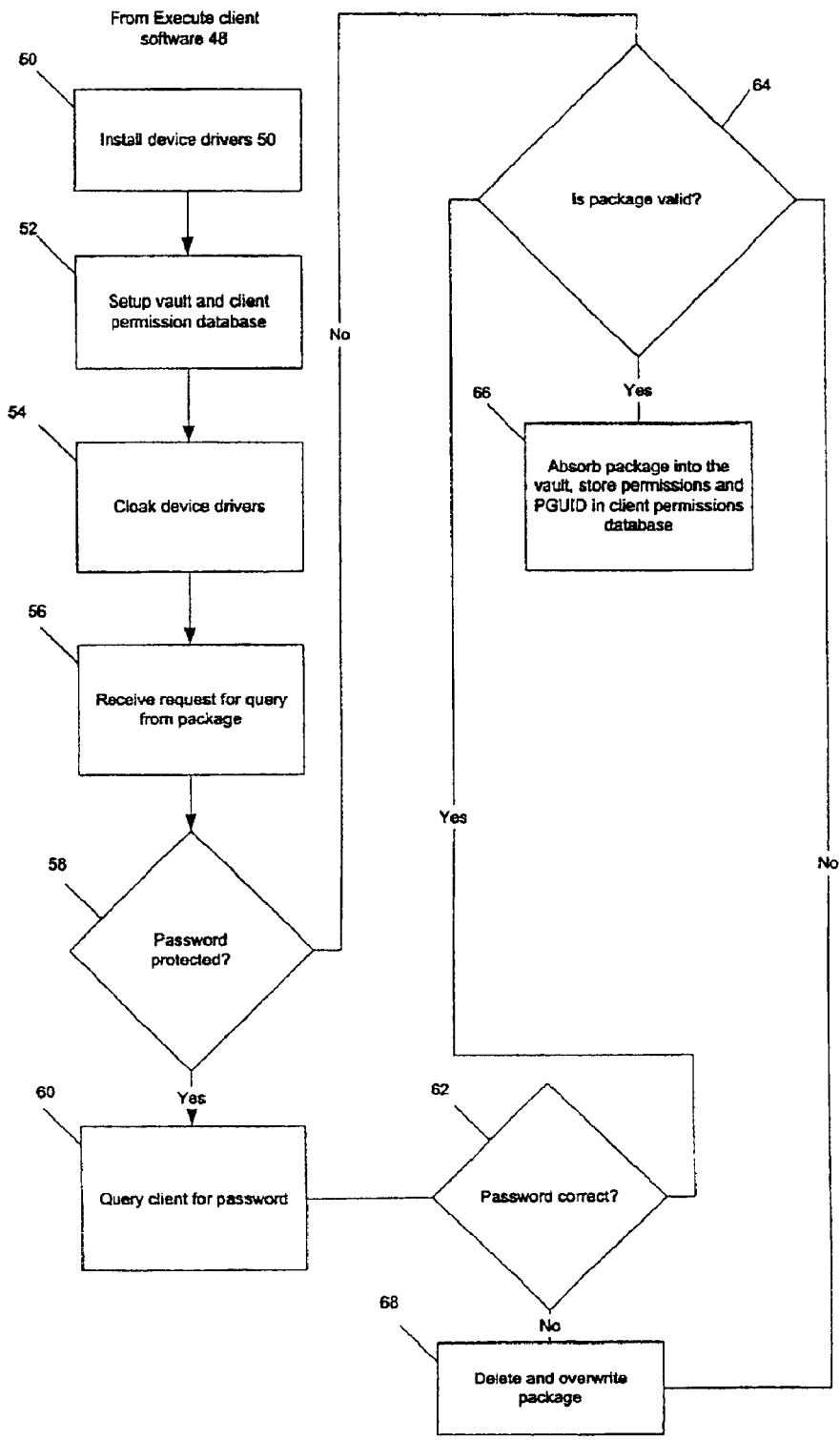

Referring now to FIG. 2, there is shown a method for communicating a package of information after the computer executable file 14 is generated, according to an embodiment of the invention. According to this method, the computer executable file 14, which comprises code to carry out the method, is executed at the client computer system 17, step 30. In the embodiment in which the package is password protected, the client is prompted for the password. In step 32, the client computer system 17 determines whether the operating system is a compatible operating system. If the operating system is not compatible, the package is deleted and overwritten, step 34. Compatible operating systems include but are not limited to Windows 95, 98, NT and 2000. Optionally, as shown in step 36 of FIG. 2, the client computer system 17 determines whether a second package of information is already loaded on the client computer system 17, and if so, terminates the second package, step 38. In step 40, the system 17 determines whether the client software 24 is installed. If the client software is not installed, the client software 24 is extracted from the package and installed on the client computer system 17, step 42. If the client software is installed, the system 17 compares the version of the client software in the package to the version of the software installed, step 44. If the version of the client software in the package is later than the version installed on the system 17, the installed client software is upgraded by extracting the newer version from the package and installing it on the system 17, step 42. In another embodiment, the client software 24 can be extracted from the package and installed without checking for an installed version.

In step 48, the client software 24 is executed creating a client permissions database and a vault on the client computer system. The vault is a virtual disk environment filly integrated with the operating system, yet sequestered from the operating system such that novel operating rules can be implemented and in which files of data can be examined, without risk to the system as a whole. In the embodiment shown in FIG. 2, the client software 24 is comprised of one or more device drivers and one or more win32 modules which are installed on the client computer system 17 upon execution of the software, step 50. At least one of the device drivers or win32 modules creates the client permission database and the vault, step 52. In a preferred embodiment, the win32 module is a modified win32 executable. The device drivers and win32 modules also carry out other functions of the software 24, such as, for example, verifying whether the permissions structure has been altered. Once all the device drivers and win32 modules are loaded, they are cloaked, in part to prevent hacking into the vault, step 54. After the installation of the client software, in a preferred embodiment, the operating system is modified such that the modified win32 executable is automatically initialized when the system 17 is powered-up.

At least one of the device drivers or win32 modules communicates with the computer executable file 14. In one embodiment, one of the win32 modules receives a request to query the package of information, step 56. The win32 module then determines whether the package of information is password protected, step 58, and if so, queries the client for a password, step 60. If the package is not password protected, or it is password protected and the correct password is entered, step 62, then the win32 module determines whether the package is valid, step 64. If the package is valid, the file of data is absorbed into the vault, the one or more permissions are stored in the client permissions database, and the client permissions database is updated with the PGUID, step 66.

Preferably, the validity of a package is determined by reading the PGUID from the package and checking the client permissions database for the PGUID. If the PGUID is in the client permissions database, the package was already received into the vault at another time and the package is invalid. If this occurs, a state in the computer executable file 14 is set to indicate that the package has already been installed. Setting the state may be, for example, changing a data bit or setting a flag. If the PGUID is not in the client permissions database, the package is new to the vault, and is valid.

In the embodiment having a RGUID in the package of information, the validity of a package is determined by checking the client permissions database for the RGUID. If the RGUID in the package of information matches the client's RGUID in the client permissions database, the package is intended for the client receiving the package, and the package is valid. If the RGUID in the package of information does not match the RGUID in the client permissions database, the package is not intended for the client, and the computer executable file 14 is deleted and overwritten, step 68.

After the file of data is absorbed into the vault, the client software 24, preferably via one of the device drivers, deletes and overwrites the computer executable file 14.

In one embodiment, after the package is determined to be valid, but before absorbing the file of data into the vault, the device driver queries the client to create an association to the file of data in the vault. The association is preferably a file, most preferably a "tag" file, which is a substantially zero-byte length file. The client can name the file in a conventional manner. To the client, the file appears to represent the actual file of data in the vault, but it is not. If the client access the properties of the tag file, a dialog box displays the one or more permissions associated with the file of data.

Once a file name has been chosen and the client has deciphered and transferred the data to the vault, the data is available for access by opening the file of data. This can be done by any user-specified process. If the user double-clicks the file, the application associated with that file-type will automatically start and attempt to open the file via a calling process. The client software 24 intercepts the calling process and performs a security check on the calling process. The security check verifies that the calling process has not created a data hole to "leak" data within the file of data. "Leaking data" means transferring data out of a system in which it is desired to have the data secured. For applications wherein data security is important, there is a need to limit data leakage.

If the calling process passes the security check, a dialog is displayed to the client to verify the client's request for the field of data. The permissions set, comprising one or more permissions, is displayed and any warnings are presented to the client for approval. Warnings include, for example, that all unsaved data will be lost once the field of data is accessed. Once the client agrees, the environment of client computer system 17 changes drastically. No process running of the system 17 will be able to modify anything on the system 17. These restrictions remain in place until the process accessing the file of data quits or is terminated by, for example, an expiration permission.

What is claimed is:

1. A method for packaging information comprising the steps of:
   receiving a file of data for packaging;
   receiving a permissions database having one or more permissions associated with the file of data, the one or more permissions governing a client's use of the file;
   generating a package global unique identifier;
   generating a package of data comprising the file, the one or more permissions and the global unique identifier;
   encrypting the package; and
   generating a computer executable file comprising the encrypted package.

2. The method of claim 1 wherein the one or more permissions are selected from the group consisting of: an access count permission, an access time permission, an expiration date permission, an authorization date permission, a clipboard permission, a print permission, an unlimited access permission, an application permission, and a system-events permission.

3. The method of claim 1 further comprising the step of setting a password for access to the computer executable file.

4. The method of claim 1 wherein the package of data further comprises a recipient global unique identifier and further comprising the step of receiving the recipient global unique identifier after the step of generating a package global unique identifier.

5. The method of claim 4 wherein the package of data further comprises a client software.

6. A machine-readable medium having a package of information comprising:
   a file of data;
   a permissions database having one or more permissions associated with the file of data, the one or more permissions governing a client's use of the file; a package global unique identifier; and
   a receiver global unique identifier.

7. The machine readable medium of claim 6 wherein the one or more permissions are selected from the group consisting of: an access count permission, an access time permission, an expiration date permission, an authorization date permission, a clipboard permission, a print permission, an unlimited access permission, an application permission, and a system-events permission.

8. The machine-readable medium of claim 7 further comprising a client software.

9. A method for communicating a package of information comprising:
   receiving a file of data for packaging;
   receiving a package permissions database having one or more permissions associated with the file of data, the one or more permissions governing a client's use of the file;
   generating a package global unique identifier;
   generating a package of data comprising the file of data, the one or more permissions, the global unique identifier, and a client software;
   encrypting the package;
   generating a computer executable file comprising the encrypted package;
   receiving the computer executable file at a client computer system having an operating system;
   executing the computer executable file at the client computer system comprising the steps of:
   determining whether the operating system is a compatible operating system, and if so,
   executing a client software on the client computer system, the execution of the client software creating a client permissions database and a vault on the client computer system; and
   determining whether the encrypted package is valid, and if so, recording the package global unique identifier in the client permissions database, extracting the file of data and the one or more permissions from the package of data,
   storing the file of data in the vault and storing the one or more permissions in the client permissions database, and if not, setting a state in the computer executable file to indicate that the package is installed.

10. The method of claim 9 further comprising the step of determining whether a second package is loaded on the computer system, and if so, terminating the second package, before the step of executing a client software on the client computer system.

11. The method of claim 9 wherein the step of determining whether the package is valid comprises the steps of searching the client permissions database for the package global unique identifier and, concluding that the package is valid if the package global unique identifier is not in the client permissions database, and concluding that the package is invalid if the package global unique identifier is not in the client permissions database.

12. The method of claim 9 wherein the package further comprises the client software having a version designation and, before the step of executing the client software, determining whether a second version of the client software is installed on the client computer system, and if not, extracting the client software from the package and installing the client software on the client computer system.

13. The method of claim 12 wherein if a second version of the client software is installed on the client computer system, determining whether the version designation of the client software installed on the client computer system is earlier than the second version, and if so, extracting the client software from the package and installing the client software on the client computer system.

14. The method of claim 12 wherein the client software comprises one or more device drivers and the client permissions database and the vault are generated by at least one of the one or more device driver.

15. The method of claim 9 wherein the client software comprises one or more device drivers and the client permissions database and the vault are generated by at least one of the one or more device driver.

16. The method of claim 9 wherein the package further comprises a receiver global unique identifier, and wherein the step of determining whether the encrypted package is valid comprises the steps of searching the client permissions database for a second receiver global unique identifier, and if not found, concluding that the package is invalid, and if found, comparing the receiver global unique identifier to the second receiver global unique identifier, determining whether they match, and if so, concluding that the package is valid, and if not, concluding that the package is invalid.

17. The method of claim 9 wherein the one or more permissions are selected from the group consisting of: an access count permission, an access time permission, an expiration date permission, an authorization date permission, a clipboard permission, a print permission, an unlimited access permission, an application permission, and a system-events permission.

18. The method of claim 9 wherein the computer executable file is password protected.

19. A system that communicates a package of information comprising:
   a machine readable medium having information packaging software that generates a computer executable file comprising a package of information, the package of information comprising:
   file of data;
   a permissions database having one or more permissions associated with the file of data; and
   encryption software;
   a network in communication with the machine readable medium; and a client computer system in communication with the network, the computer system adapted to receive the package of information and execute the computer executable file, the computer system having a client permissions database and a vault adapted to receive the package of information.

20. The system of claim 19 wherein the package of information further comprises a package global unique identifier, and the client computer system further comprises a module of computer code adapted to read the package global unique identifier, search the client permissions database for the package global unique identifier, and reject the package if the package global unique identifier is found in the client permissions database.

21. The system of claim 19 wherein the package of information further comprises a recipient global unique identifier, and the client computer system further comprises a module of computer code adapted to read the recipient global unique identifier, search the client permissions database for the recipient global unique identifier, and reject the package if the recipient global unique identifier is not found in the client permissions database.

22. The system of claim 19 wherein the one or more permissions are selected from the group consisting of: an access count permission, an access time permission, an expiration date permission, an authorization date permission, a clipboard permission, a print permission, an unlimited access permission, an application permission, and a system-events permission.

* * * * *

UNITED STATES PATENT AND TRADEMARK OFFICE
CERTIFICATE OF CORRECTION

PATENT NO. : 7,039,806 B1  Page 1 of 1
APPLICATION NO. : 09/701230
DATED : May 2, 2006
INVENTOR(S) : Friedman et al.

It is certified that error appears in the above-identified patent and that said Letters Patent is hereby corrected as shown below:

<u>In Column 1</u>

At line 43, please change "mail" to --email--.

Signed and Sealed this

Twenty-ninth Day of May, 2007

JON W. DUDAS
*Director of the United States Patent and Trademark Office*